US006988101B2

(12) United States Patent
Ham et al.

(10) Patent No.: US 6,988,101 B2
(45) Date of Patent: Jan. 17, 2006

(54) METHOD, SYSTEM, AND COMPUTER PROGRAM PRODUCT FOR PROVIDING AN EXTENSIBLE FILE SYSTEM FOR ACCESSING A FOREIGN FILE SYSTEM FROM A LOCAL DATA PROCESSING SYSTEM

(75) Inventors: Jungkyoo Pamela Ham, San Jose, CA (US); Brent Cecil Hawks, Hollister, CA (US); Sean James Martin, Boston, MA (US); Moshe Morris Emanuel Matsa, Cambridge, MA (US); Gary I. Mazo, San Jose, CA (US); Peter Nicholls, Scarborough (CA); Ira L. Sheftman, San Jose, CA (US); James Pangborn Wells, Boston, MA (US); Ronald So-tse Woan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 09/872,054

(22) Filed: May 31, 2001

(65) Prior Publication Data

US 2003/0009473 A1 Jan. 9, 2003

(51) Int. Cl.
*G06F 17/30* (2006.01)

(52) U.S. Cl. .................... 707/10; 707/102; 707/104.1; 709/202; 709/203

(58) Field of Classification Search ................ 707/1–3, 707/10, 102, 104.1; 709/202, 203
See application file for complete search history.

(56) References Cited

U.S. PATENT DOCUMENTS 4,956,809 A  9/1990  George et al. ............. 364/900

5,218,697 A  6/1993  Chung ...................... 395/650

(Continued)

FOREIGN PATENT DOCUMENTS

| JP | 6243020 A | 9/1994 |
|----|-----------|--------|
| JP | 7230396 A | 8/1995 |

(Continued)

OTHER PUBLICATIONS

IBM Technical Disclosure Bulletin, "File Interface for Migrating Applications to Enhanced Persistent Storage Platforms", vol. 35, No. 1A, Jun. 1992, pp. 182–183.

IBM Technical Disclosure Bulletin, "As/400 OS/2 PC Support Shared Folders", vol. 32, No. 7, Dec. 1989, pp. 202–205.

(Continued)

*Primary Examiner*—Greta Robinson
*Assistant Examiner*—Debbie M. Le
(74) *Attorney, Agent, or Firm*—David W. Victor; Konrad, Raynes & Victor LLP

(57) ABSTRACT

An extensible file access method for accessing a first foreign file system from a data processing system with a first native file system, said first foreign file system and said first native file system implementing different file system protocols. The foreign file system is accessed by issuing a request according to the native file system protocol for data stored in the foreign file system; translating the native file system request to an intermediate programming interface, wherein the intermediate programming interface is different from both the native file system protocol and the foreign file system protocol; translating the intermediate file system request to the foreign file system protocol; and returning to the client a response from the foreign file system responsive to the translated request.

36 Claims, 4 Drawing Sheets

U.S. PATENT DOCUMENTS

| | | | |
|---|---|---|---|
| 5,363,487 A | | 11/1994 | Willman et al. ............. 395/275 |
| 5,537,592 A | | 7/1996 | King et al. ................. 395/600 |
| 5,608,874 A | * | 3/1997 | Ogawa et al. .............. 709/246 |
| 5,680,618 A | * | 10/1997 | Freund ........................... 707/7 |
| 5,742,818 A | | 4/1998 | Shoroff et al. .............. 395/616 |
| 5,752,005 A | | 5/1998 | Jones ......................... 395/500 |
| 5,864,853 A | | 1/1999 | Kimura et al. ................ 707/10 |
| 5,911,776 A | | 6/1999 | Guck ........................ 709/217 |
| 5,937,406 A | | 8/1999 | Balabine et al. ............ 707/100 |
| 5,987,463 A | * | 11/1999 | Draaijer et al. ............... 707/10 |
| 6,226,649 B1 | * | 5/2001 | Bodamer et al. ........ 707/104.1 |
| 6,236,997 B1 | * | 5/2001 | Bodamer et al. ............. 707/10 |
| 6,643,652 B2 | * | 11/2003 | Helgeson et al. ............. 707/10 |

FOREIGN PATENT DOCUMENTS

| | | |
|---|---|---|
| JP | 8137728 A | 5/1996 |
| JP | 9231114 A | 9/1997 |
| JP | 10247155 A | 8/1998 |
| JP | 10260877 A | 9/1998 |

OTHER PUBLICATIONS

IBM Technical Disclosure Bulletin, "OS/2 Logical File System", vol. 34, No. 12, May 1992, pp. 370–371.

IBM Technical Disclosure Bulletin, "Implicit Mapping of File Data", vol. 38, No. 04, Apr. 1995, p. 523.

IBM Technical Disclosure Bulletin, "Method to Manage the Mapping of Logical to Physical Record", vol. 38, No. 12, Dec. 1995, pp. 261–262.

* cited by examiner

METHOD, SYSTEM, AND COMPUTER PROGRAM PRODUCT FOR PROVIDING AN EXTENSIBLE FILE SYSTEM FOR ACCESSING A FOREIGN FILE SYSTEM FROM A LOCAL DATA PROCESSING SYSTEM

A portion of the Disclosure of this patent document contains material which is subject to copyright protection. The copyright owner has no objection to the facsimile reproduction by anyone of the patent document or the patent disclosure, as it the Patent and Trademark Office patent file or records, but otherwise reserves all copyrights whatsoever.

BACKGROUND OF THE INVENTION

1. Field of the Invention

The present invention relates in general to computer file systems, and more particularly to an extensible file access method for accessing a foreign file system from a data processing system with a native file system, said foreign file system and said native file system implementing different file system protocols.

2. Description of the Related Art

A file system comprises the logical structures and software function routines used to store, organize, and access information stored on a computer system's logical or physical storage media, such as a diskette, hard disk system, or optical storage. A variety of file systems have been developed to address various needs. For example, personal computer file systems comprise: File Allocation Table (FAT); Virtual FAT (VFAT); 32-Bit FAT (FAT32); New Technology File System (NTFS); and High Performance File System (HPFS). File systems for mid-range computers comprise: Unix File System (UFS), Network File System (NFS), and AS/400. Mainframe computer file system offerings comprise: Virtual Storage Access Method (VSAM); Sequential Access Method (SAM); Partitioned Data Set (PDS); and Object Access Method (OAM). File systems are not limited to these lists which are merely illustrative subsets of the numerous variety of file systems.

The various computer architectures and computer operating systems may use different file systems, thus organizing and accessing the information in different ways. Generally, these different file systems are incompatible, meaning that files created by one file system may not be accessed by another file system. A user may have a computer system supporting a particular file system, a native file system, and the user may wish to access and use information stored in a file system other than the native file system, a foreign file system. The user may need to access the foreign file system information for any of a number of motivations, such as to migrate the information to a replacement system, to archive the information, or to share the information among different systems.

Conventional systems have addressed this user need to access foreign file systems in a number of ways. The earliest conventional approach was to create a duplicate of the information and to convert the information in this duplicate from the native file system format to the foreign file system format. This approach is exemplified by patents such as U.S. Pat. No. 5,537,592, "System and Method for Reading and Writing Disks Formatted for an Operating System Foreign to the Host Computer;" U.S. Pat. No. 5,742,818, "Method and System of Converting Data from a Source File System to a Target File System;" Japan Patent Number 9231114A, "File System Conversion System;" and "Japan Patent Number 6243020A, "File Conversion Device." U.S. Pat. No. 5,537,592 is representative of this approach, and in particular teaches a set of processes and data structures that allow transfer of user specified files between differently formatted disks. The processes identify the file format of the source and destination disks, retrieve the source files in the source file format, store the source files in a common format in memory that allows the directory hierarchy of the source disk and destination disk to be maintained, translate the contents of text source file records to the record format of the destination file system if desired, create directories and headers if necessary for the foreign disk for the transferred files, and store the files on the destination disk in a host file format. The user can then access and modify the files in the host file format using a host computer system. This approach is only a partial solution in that it only converts and reformats the information, it does not convert the software functions. The native file system can still only access information stored in the native file system format; it cannot access information stored in the foreign file system format, nor can it use the foreign file system software functions.

Another conventional solution is to install and support both file systems on the same computer system., effectively making the foreign file system an additional native file system. This solution is taught by U.S. Pat. No. 5,363,487, "Method and System for Dynamic Volume Tracking in an Installable File System," which permits a single operating system to access a storage medium formatted in accordance with differing file systems. Generally, the operating system identifies which of a plurality of file system drivers is appropriate for reading a particular storage volume and, thereafter, associates the identified file system driver with the particular storage volume. Similarly, U.S. Pat. No. 5,911,776, "Automatic Format Conversion System and Publishing Methodology for Multi-user Network," provides a set of multiple shadow file converters connected to a source file of an original document. Each shadow file converter enables the transformation of the original source file format into a particular other specific type of file format. However, providing all the permutations of the different types of file systems ported to the different types of operating systems and computer hardware architectures is probably not commercially feasible.

A more robust conventional approach is to directly convert file system requests from one file system protocol to another. For example, a client system, having a native file system protocol, may issue a request in the client's native file system protocol to a server. However, the server uses a foreign file system protocol which is different form the client's native file system protocol. A file system protocol converter translates the client's request from the client's native file system protocol to the server's foreign file system protocol. The file system converter may also convert the server response by reformatting the response's information from the server's foreign file system format to the client's native file system format. This type of direct file system protocol conversion is taught by: U.S. Pat. No. 5,218,697, "Method and System for Networking Computers Having Varying File Architectures;" U.S. Pat. No. 5,752,005, "Foreign File System Establishing Method which Uses a Native File System Virtual Device Driver;" U.S. Pat. No. 5,937,406, "File System Interface to a Database;" U.S. Pat. No. 5,864,853, "Portable File System Operable Under Various Computer Environments;" and U.S. Pat. No. 4,956,809, "Method for Canonical Ordering of Binary Data for Portable Operating Systems." Foreign patents representative of this approach include: Japan Patent Number 10247155A, "File System Interface for Data Base;" Japan Patent Number 8137728A, "Portable File System and File Data Processing Method;" Japan Patent Number 7230396A, "Mutual Constitution System for Different Kinds of File System Forms;" and Japan Patent Number 10260877A, "Protocol Conversion System in Client Server System, Method Therefor and Recording Medium Programmed and Recorded with the Method." Publications of this approach include: "File Interface for Migrating Applications to Enhanced Persistent Storage Platforms," IBM Technical Disclosure Bulletin, June 1992, p. 182–183; "AS/400 OS/2 PC Support Shared Folders," id., December 1989, p. 202–205; "Method to Manage the Mapping of Logical to Physical Record," id., December 1995, p. 261–262; "Implicit Mapping of File Data," id., April 1995, p. 523–524; and "OS/2 Logical File System," id., May 1992, p. 370–371. Although this approach is a significant improvement over merely converting the information format, it still suffers from the disadvantage of even more permutations, where the permutations for each converter for a different pair of source and target file systems ported to the different types of operating systems and computer hardware architectures is also probably not commercially feasible.

Thus, there is a clearly felt need for a method, system and computer program product for providing an improved extensible file access method for accessing a foreign file system from a data processing system with a native file system, said foreign file system and said native file system implementing different file system protocols.

SUMMARY OF THE INVENTION

The present invention comprises an extensible file access method for accessing a first foreign file system from a data processing system with a first native file system, said first foreign file system and said first native file system implementing different file system protocols.

In accordance with an aspect of a preferred embodiment of the present invention, an extensible file access method for accessing a foreign file system from a data processing system with a native file system, said foreign file system and said native file system implementing different file system protocols, comprises the steps of:

issuing a request according to the native file system protocol for data stored in the foreign file system;

translating the native file system request to an intermediate programming interface, wherein the intermediate programming interface is different from both the native file system protocol and the foreign file system protocol;

translating the intermediate file system request to the foreign file system protocol; and returning to the data processing system a response from the foreign file system responsive to the translated request.

In accordance with another aspect of a preferred embodiment of the present invention, the extensible file access method is extended to support a second foreign file system by determining the second foreign file system protocol and by providing a translation from the intermediate programming interface to the second foreign file system protocol.

In accordance with another aspect of a preferred embodiment of the present invention, the extensible file access method is extended to support a second native file system by determining the native file system protocol and by providing a translation from the second native file system protocol to the intermediate programming interface.

In accordance with another aspect of a preferred embodiment of the present invention, the intermediate programming interface comprises a set of generic access functions common to the native file system protocol and the foreign file system protocol, and comprises a set of file system specific functions which are not common to the file system protocols.

In accordance with another aspect of a preferred embodiment of the present invention, the set of generic access functions common to the native file system protocol and the foreign file system protocol are translated from the native file system protocol to the intermediate programming interface which is then translated to the foreign file system protocol, and the set of file system specific functions which are not common to the file system protocols are not translated from the native file system protocol to the intermediate programming interface.

In accordance with another aspect of a preferred embodiment of the present invention, the set of file system specific functions which are not common to the file system protocols further comprises a set of extended native file system functions which have no equivalent function in the foreign file system protocol.

In accordance with another aspect of a preferred embodiment of the present invention, the set of extended native file system functions causes a predetermined response to be sent to the data processing system.

In accordance with another aspect of a preferred embodiment of the present invention, the set of file system specific functions which are not common to the file system protocols further comprises and a set of extended foreign file system functions which have no equivalent function in the native file system protocol.

In accordance with another aspect of a preferred embodiment of the present invention, the set of extended foreign file system functions are passed through to the foreign file system in an untranslated form.

A preferred embodiment of the present invention has the advantage of providing a method for integrating existing applications which use a native file system with back-end data management systems which use a separate foreign file system.

A preferred embodiment of the present invention has the advantage of allowing an application written for the native file system to read and write data to a back-end application or back-end data store without requiring file system modifications of that application.

A preferred embodiment of the present invention has the advantage of allowing the native file system application to create, view and manipulate the meta-data for the back-end application from the native file system application.

A preferred embodiment of the present invention has the advantage of allowing the foreign file system application to appear as if it is written to the native file system.

A preferred embodiment of the present invention has the advantage of allowing the native file system application to access the foreign file system as if it is a native file system.

A preferred embodiment of the present invention has the advantage of reducing the complexity of supporting an additional native file system.

A preferred embodiment of the present invention has the advantage of reducing the complexity of supporting an additional foreign file system.

A preferred embodiment of the present invention has the advantage of reducing the complexity of translating from multiple native file system protocols to multiple foreign file system protocols.

A preferred embodiment of the present invention has the advantage of allowing the native file system application by use of the virtual file system to seamlessly access statically stored files (such as File Transfer Protocol (FTP), Hypertext Transfer Protocol (HTTP), hierarchical data base files, relational data base files, and object oriented database files) and dynamically constructed files (such as Information Management System (IMS) transactions or Customer Information Control System (CICS) transactions).

A preferred embodiment of the present invention has the advantage of providing a consistent and potentially standard method for accessing back-end storage systems.

A preferred embodiment of the present invention has the advantage of providing a unified storage access model which allows native file system applications and the native operating system to seamlessly import and export data to back-end server systems via the virtual file system by presenting the back-end systems in a way as to be indistinguishable from the local file system.

BRIEF DESCRIPTION OF THE DRAWINGS

For a more complete understanding of the present invention and the advantages thereof, reference is now made to the Description of the Preferred Embodiment in conjunction with the attached Drawings, in which.

DESCRIPTION OF THE PREFERRED EMBODIMENT

Figure 1:
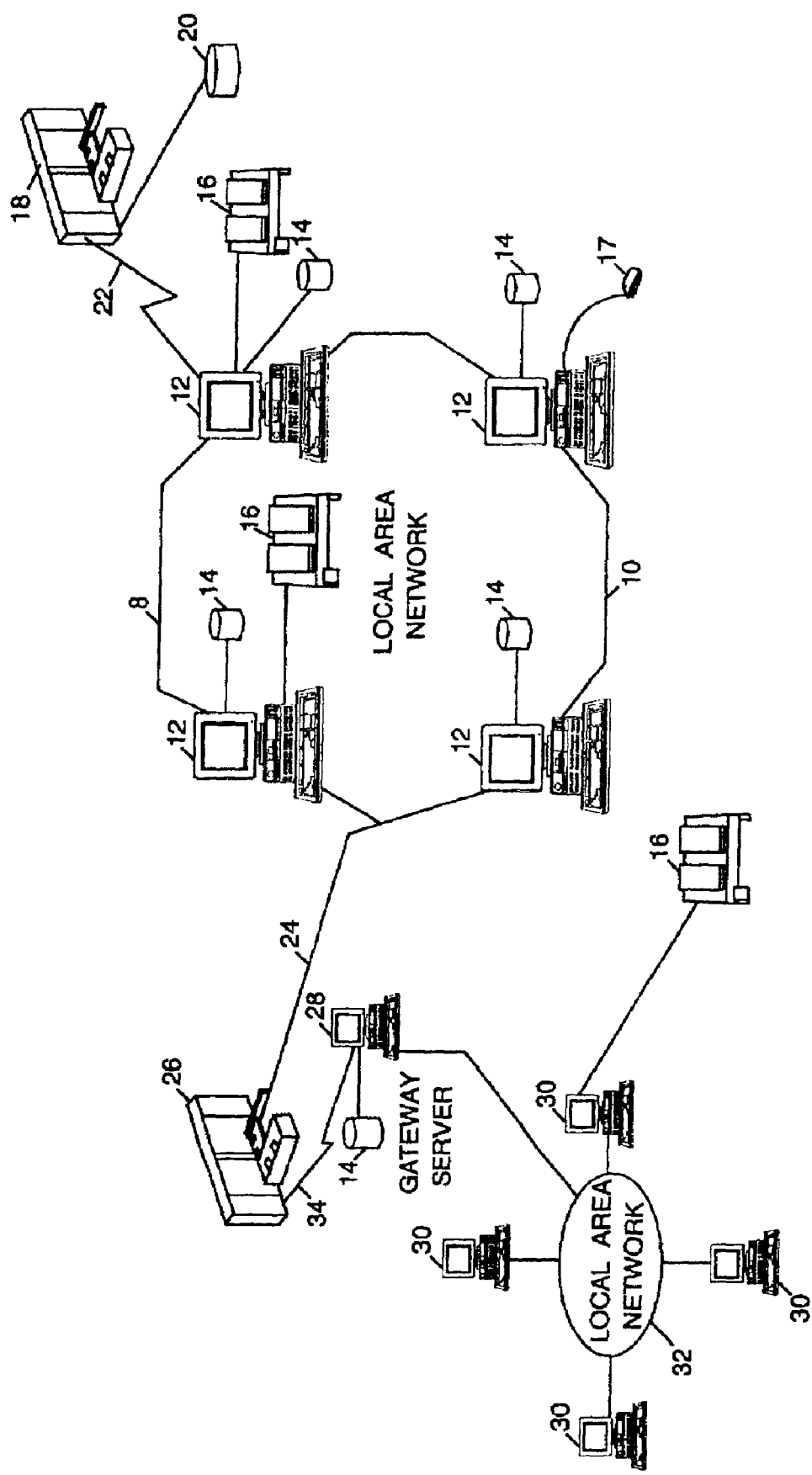
FIG. 1 is a block diagram of a distributed computer system which may be used in performing the method of an embodiment of the present invention, forming part of the apparatus of an embodiment of the present invention, and which may use the article of manufacture comprising a computer-readable storage medium having a computer program embodied in said medium which may cause the computer system to practice an embodiment of the present invention.

Referring first to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

As will be appreciated upon reference to the foregoing, it is often desirable for a user working on a workstation 12 to be able to access information or files stored on host storage device 20 on the host 18. Such files are usually stored on host storage device 20 in accordance with a host file system protocol which is different from the workstation file system protocol used to store files on the workstation 12. The present invention provides an extensible file access method and virtual file system which allows an application executing on the workstation 12, having a native file system for files stored on the workstation 12, to access files stored on the host storage device 20, the host storage files being stored in a foreign file system implementing a different file system protocol from the workstation or native file system protocol.

Figure 2:
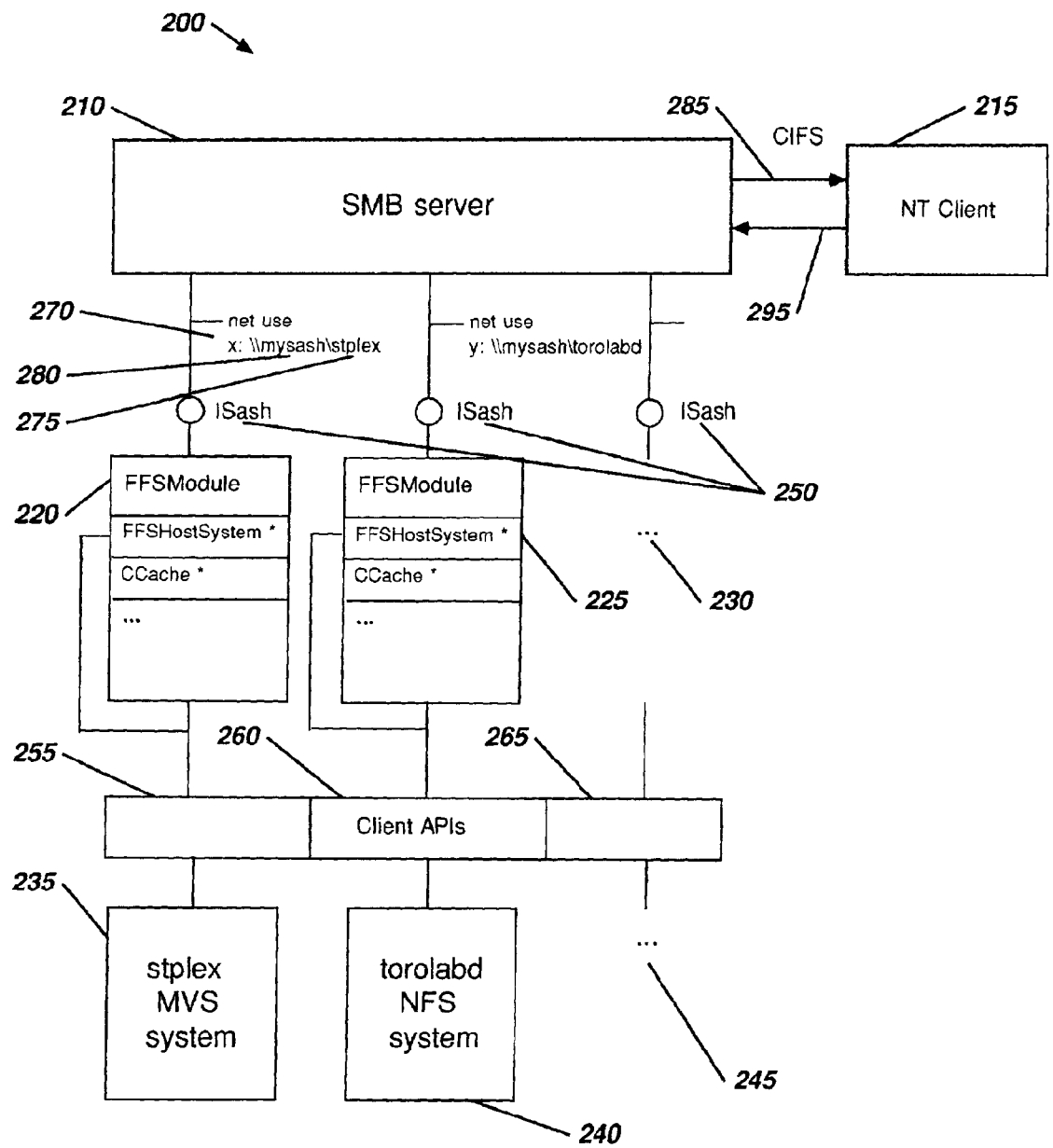
FIG. 2 is a block diagram of an architecture of a preferred embodiment of the present invention.

Referring next to FIG. 2, there is shown a block diagram of an architecture of a preferred embodiment of the present invention. The foreign file system 20 is accessed by issuing a request according to the native file system protocol 285 for data stored in the foreign file system 20; translating the native file system request to an intermediate programming interface 250, wherein the intermediate programming interface 250 is different from both the native file system protocol 285 and the foreign file system protocol (255, 260, or 265); translating the intermediate file system request to the foreign file system protocol; and returning to the data processing system a response 295 from the foreign file system responsive to the translated request. Multiple foreign file systems 235 and 240 may be supported by determining a second foreign file system protocol and by providing a translation from the intermediate programming interface to the second foreign file system protocol. Also, multiple native file systems may be supported by determining a second native file system protocol and by providing a translation from the second native file system protocol to the intermediate programming interface.

The intermediate programming interface comprises a set of generic access functions common to the native file system protocol and the foreign file system protocol and a set of file system specific functions which are not common to the file system protocols. The set of generic access functions common to the native file system protocol and the foreign file system protocol are translated from the native file system protocol to the intermediate programming interface which is then translated to the foreign file system protocol, and the set of file system specific functions which are not common to the file system protocols are not translated from the native file system protocol to the intermediate programming interface which is then translated to the foreign file system protocol. Existing applications which use a native file system may be more easily integrated with back-end data management systems which use a separate foreign file system without requiring file system modifications of the existing application. A foreign file system application may appear as if it is written to the native file system, and a native file system application may access the foreign file system as if it is a native file system. A dynamic virtual file system may be constructed to support a consistent standard interface to seamlessly access statically stored files and dynamically constructed files.

Sash 200 is a replacement for a conventional Common Internet File System (CIFS) server. It consists of a Server Message Block (SMB) server 210 which interfaces to a client 215, and one or more FSModule backends 220, 225, and 230 which interface on one side to the SMB server 210 and on the other side to the backends 235, 240, and 245. The SMB server 210 includes the server itself, the logging system and the control file that manages the SMB server. The design and implementation of the SMB server is based on an Internet-Draft, A Common Internet File System (CIFS) Protocol, http://msdn.microsoft.com/workshop/networking/cifs/default.asp.

The backend, FFSModule 220, exposes ISash 250 which is a Common Object Model (COM) interface to communicate with the SMB server. The FFSModule receives requests from the SMB server through ISash, translates them to appropriate application programming interfaces (APIs) 255, 260, and 265 provided by client-API dynamic link libraries (dlls). The FFSModule then returns the pertinent information to the SMB server.

A COM interface, ISash 250, defines the intermediate programming interface between the SMB 210 and the FFSModule 220, 225, and 230. The ISash interface comprises disk type calls and is described in Table A.

FFSModule is a COM object. When the network command "net use devicename: \\SMBservername\sharename" 270 is issued, the SMB 210 creates a new instance of FFSModule object 220 associated with the given sharename 275 and acquires the ISash interface pointer. The "SMBservername" 280 is the name of the SMB server, and "sharename" 275 is a system name or a dataset name provided by a user. After SMB gets the ISash pointer, it sends the first request to FFSModule to mount the sharename to a drive letter. Once a system 235 or a data set is mounted, it is simply treated as if it was a local native file system drive.

The following Table A is the list of requests that can come into SMB (a native file system protocol), the translated request (intermediate programming interface) to FFSModule from SMB, and the translated API calls made by FFSModule (foreign file system protocol) to obtain the necessary data from the file system, an MVS file system in this example:

TABLE A

| Client to SMB Interface<br>SMB Call | SMB to ISash Interface<br>ISash Call | ISash to MVS<br>MVS Call |
|---|---|---|
| SMB_COM_CHECK_DIRECTORY | CheckDirectory | CheckDirectory(BSTR InDirName, BYTE Is8p3, SashIDUnit uid, SashIDUnit pid, BSTR *OutDirName, BYTE *DoesExist)<br>DirectoryListing *<br>DirectoryListing::getListing(*m_pHost, Qualifier);<br>new DirectoryListing::Cursor(**ppDirList, CsrPattern);<br>DirectoryListing::Cursor::setToFirst();<br>DirectoryListing::Cursor::isValid();<br>DirectoryListing::Cursor::element();<br>unsigned char FFSFileItem::isDirectory() |
| SMB_COM_CLOSE | CloseFile | CloseFile( SashFid Fid, BYTE Flags, SHORT Options )<br>The file object created at open time will be deleted. |
| SMB_COM_CREATE_DIRECTORY<br>TRANS2_CREATE_DIRECTORY | CreateDirectory | CreateDirectory(BSTR NewDirectory, SashIDUnit uid, SashIDUnit pid )<br>Not supported. |
| SMB_COM_DELETE | DeleteFile | DeleteFile( BSTR FileName, SashFileAttributes FileAttributes, SashIDUnit uid, SashIDUnit pid )<br>FFSConnectedDrive *<br>HostSystem::returnConnection(0,FALSE);<br>Result *<br>FFSConnectedDrive::deleteFile(SlashName); |
| SMB_QUERY_FILE_BASIC_INFO<br>SMB_INFO_STANDARD<br>SMB_INFO_QUERY_EA_SIZE<br>SMB_INFO_QUERY_EAS_FROM_LIST<br>SMB_INFO_QUERY_ALL_EAS<br>SMB_INFO_IS_NAME_VALID<br>TRANS2_QUERY_PATH_INFORMATION<br>SMB_QUERY_FILE_STANDARD_INFO<br>SMB_QUERY_FILE_EA_INFO<br>SMB_QUERY_FILE_NAME_INFO<br>SMB_COM_SET_INFORMATION<br>TRANS2_SET_PATH_INFORMATION | FileAttributes | FileAttributes( BSTR FileName, SHORT Options, SashFileAttributes InAttributes, SashDate InDate, SashTime InTime, SashIDUnit uid, SashIDUnit pid, LONG *OutSize,<br>SashFileAttributes *OutAttributes,<br>SashDate *OutDate SashTime *OutTime ) |

TABLE A-continued

| Client to SMB Interface<br>SMB Call | SMB to ISash Interface<br>ISash Call | ISash to MVS<br>MVS Call |
|---|---|---|
| TRANS2_SET_PATH_INFORMATION<br>SMB_INFO_STANDARD<br>SMB_INFO_QUERY_EA_SIZE | FileDateTime | FileDateTime( SashFid Fid, BYTE Flags,<br>SashDate InDate, SashTime InTime,<br>SashDate *OutDate, SashTime *OutTime )<br>Not called by SMB |
| SMB_COM_FIND_CLOSE, FIND_CLOSE2 | FindFileClose | |
| SMB_COM_FIND<br>TRANS2_FIND_FIRST2<br>SMB_FIND_FILE_FULL_DIRECTORY_INFO<br>SMB_FIND_FILE_BOTH_DIRECTORY_INFO | FindFirstFile | FindFirstFile( BSTR SearchPattern,<br>SashFileAttributes SearchAttributes,<br>SashIDUnit uid, SashIDUnit pid,<br>BSTR *FileName, BSTR *ShortFileName,<br>SashDate *CreationDate,<br>SashTime *CreationTime,<br>SashDate *LastAccessDate,<br>SashTime *LastAccessTime,<br>SashDate *LastModifyDate,<br>SashTime *LastModifyTime,<br>SashFileAttributes *FileAttributes,<br>LONG *Size, FindHandle *hFind )<br>DirectoryListing *<br>DirectoryListing::getListing(*m_pHost, Qualifier)<br>new DirectoryListing::Cursor(**ppDirList,<br>CsrPattern)<br>DirectoryListing::Cursor::setToFirst( )<br>DirectoryListing::Cursor::isValid( )<br>DirectoryListing::Cursor::element( )<br>unsigned char FFSFileItem::isFile( )<br>const FFSFile & FFSFileItem::asFile( )<br>const FFSFile & FFSFileItem::asDirectory( )<br>FFSTimeStamp::year( )<br>FFSTimeStamp::month( )<br>FFSTimeStamp::day( )<br>FFSTimeStamp::hour( )<br>FFSTimeStamp::minute( )<br>FFSTimeStamp::second( ) |
| SMB_COM_FIND<br>TRANS2_FIND_FIRST2<br>TRANS2_FIND_NEXT2 | FindNextFile | FindNextFile( FindHandle hFind, BYTE Flags,<br>BSTR *FileName, BSTR *ShortFileName,<br>SashDate *CreationDate,<br>SashTime *CreationTime,<br>SashDate *LastAccessDate,<br>SashTime *LastAccessTime,<br>SashDate *LastModifyDate,<br>SashTime *LastModifyTime,<br>SashFileAttributes *FileAttributes,<br>LONG *Size )<br>DirectoryListing::Cursor::setToNext( );<br>DirectoryListing::Cursor::isValid( )<br>DirectoryListing::Cursor::element( ).isFile()<br>const FFSFile & FFSFileItem::asFile( )<br>const FFSFile & FFSFileItem::asDirectory( )<br>FFSTimeStamp::year( )<br>FFSTimeStamp::month( )<br>FFSTimeStamp::day( )<br>FFSTimeStamp::hour( )<br>FFSTimeStamp::minute( )<br>FFSTimeStamp::second( ) |
| SMB_COM_FLUSH | FlushVolume | FlushVolume( BYTE Flags,<br>SashIDUnit uid, SashIDUnit pid)<br>FFSFileFile::flush(); |
| Not applicable | GetCustomInterface | GetCustomInterface( BSTR Path, IUnknown<br>**pIUnknown )<br>This call is currently not used. It will be<br>inplemented if necessary. |
| TRANS2_QUERY_FILE_INFORMATION | GetFileInfo | GetFileInfo( SashFid Fid, BSTR *FileName,<br>BSTR<br>*ShortFileName,<br>BSTR *Path,<br>SashDate *CreationDate,<br>SashTime *CreationTime,<br>SashDate *LastAccessDate,<br>SashTime *LastAccessTime,<br>SashDate *LastModifyDate,<br>SashTime *LastModifyTime,<br>SashFileAttributes *FileAttributes, LONG *Size )<br>FFSFileFile::createdTime()->year()<br>FFSFileFile::createdTime()->month()<br>FFSFileFile::createdTime()->day()<br>FFSFileFile::createdTime()->hour() |

TABLE A-continued

| Client to SMB Interface<br>SMB Call | SMB to ISash Interface<br>ISash Call | ISash to MVS<br>MVS Call |
|---|---|---|
| | | FFSFileFile::createdTime()->minute()<br>FFSFileFile::createdTime()->second()<br>FFSFileFile::lastReadTime()->year()<br>FFSFileFile::lastReadTime()->month()<br>FFSFileFile::lastReadTime()->day()<br>FFSFileFile::lastReadTime()->hour()<br>FFSFileFile::lastReadTime()->minute()<br>FFSFileFile::lastReadTime()->second()<br>FFSFileFile::lastModifiedTime()->year()<br>FFSFileFile::lastModifiedTime()->month()<br>FFSFileFile::lastModifiedTime()->day()<br>FfSFileFile::lastModifiedTime()->hour()<br>FileFile::lastModifiedTime()->minute()<br>FFSFileFile::lastModifiedTime()->second()<br>FFSFileFile::length(); |
| SMB_QUERY_FS_SIZE_INFO<br>TRANS2_QUERY_FS_INFORMATION | GetFSFreeSpace | GetFSFreeSpace( BSTR FSName,<br>SashIDUnit uid, SashIDUnit pid,<br>LONG *SectorsPerCluster,<br>LONG *BytesPerSector,<br>LONG *NumOfFreeClusters,<br>LONG *TotalNumberOfClusters )<br>This call is not applicable to MVS. Provide<br>dummy data to satisfy SMB.<br>*SectorsPerCluster = 256;<br>*BytesPerSector = 256;<br>*NumOfFreeClusters = 126;<br>*TotalNumberOfClusters = 4096; |
| Not applicable | Init | Init( BSTR Paths, BYTE *UseCompletePath )<br>FFSControl::loadSystemXML();<br>HostSystem *<br>FFSControl::getSystem(ServerName); |
| SMB_COM_OPEN<br>SMB_COM_CREATE<br>SMB_COM_NT_CREATE_ANDX | OpenFile | OpenFile(BSTR FileName, SashFileAttributes<br>Attribs, SHORT Options, BYTE Flags,<br>SashIDUnit uid, SashIDUnit pid, SHORT<br>*Result, SashFid *Fid)<br>DirectoryListing *<br>DirectoryListing::getListing(*m_pHost, Qualifier);<br>new DirectoryListing::Cursor(**ppDirList,<br>CsrPattern);<br>DirectoryListing::Cursor::setToFirst();<br>DirectoryListing::Cursor::isValid();<br>DirectoryListing::Cursor::element();<br>unsigned char FFSFileItem::isDirectory()<br>new<br>FFSFileDirectory(SlashName,Attr,m_pCurrentHost);<br>new<br>FFSFileFile(SlashName,Attr,m_pCurrentHost);<br>FFSFileFile::flush(); |
| SMB_INFO_VOLUME<br>TRANS2_QUERY_FS_INFORMATION<br>SMB_QUERY_FS_VOLUME_INFO<br>SMB_COM_QUERY_INFORMATION_DISK | QueryVolumeInfo | QueryVolumeInfo( SashIDUnit uid, SashIDUnit<br>pid, BSTR *VolumeName,<br>LONG *VolumeSerialNumber)<br>This call is not applicable to MVS. Provide<br>dummy data to satisfy SMB. |
| SMB_COM_READ<br>SMB_COM_LOCK_AND_READ<br>SMB_COM_READ_RAW<br>SMB_COM_READ_MPX<br>SMB_COM_READ_ANDX | Read | Read( SashFid Fid, LONG Offset, LONG Count,<br>SAFEARRAY **buf, LONG *BytesRead )<br>FFSFileFile::get(Offset,Count); |
| SMB_COM_DELETE_DIRECTORY | RemoveDirectory | RemoveDirectory(BSTR Directory,<br>SashIDUnit uid, SashIDUnit pid)<br>Not supported. |
| SMB_COM_RENAME<br>SMB_COM_NT_RENAME | Rename | Rename( BSTR OldFileName,<br>SashFileAttributes FileAttributes1,<br>BSTR NewFileName,<br>SashFileAttributes FileAttributes2,<br>SashIDUnit uid, SashIDUnit pid,<br>BYTE Reserved)<br>FFSConnectedDrive *<br>HostSytem::returnConnection(0,FALSE);<br>DirectoryListing *<br>DirectoryListing::getListing(*m_pHost,<br>Qualifier);<br>new DirectoryListing::Cursor(**ppDirList,<br>CsrPattern);<br>DirectoryListing::Cursor::setToFirst();<br>DirectoryListing::Cursor::isValid(); |

TABLE A-continued

| Client to SMB Interface<br>SMB Call | SMB to ISash Interface<br>ISash Call | ISash to MVS<br>MVS Call |
|---|---|---|
| | | DirectoryListing::Cursor::element();<br>unsigned char FFSFileItem::isDirectory()<br>Result * FFSConnectedDrive::renameFile<br>(SlashOldName,SlashNewName); |
| SMB_COM_SEEK | Seek | Seek( SashFid Fid, LONG Offset, BYTE Mode,<br>LONG *NewOffset )<br>FFSFileFile::seek(CurrPos + Offset);<br>FFSFileFile::tell();<br>FFSFileFile::seekToEnd(); |
| SMB_COM_TREE_DISCONNECT<br>TREE_DISCONNECT | UnInit | UnInit()<br>Destroy all the file objects created.<br>Destroy all the DirectoryListing created. |
| SMB_COM_LOCKING_ANDX<br>SMB_COM_WRITE_AND_UNLOCK<br>SMB_COM_TREE_DISCONNECT | UnlockFile | UnlockFile( SashFid Fid )<br>Not called by SMB |
| SMB_COM_WRITE<br>SMB_COM_WRITE_PRINT_FILE<br>SMB_COM_WRITE_AND_UNLOCK<br><br>SMB_COM_READ_RAW<br>SMB_COM_WRITE_MPX<br>SMB_COM_WRITE_RAW<br>SMB_COM_WRITE_COMPLETE<br>SMB_COM_WRITE_MPX_SECONDARY<br>SMB_COM_WRITE_AND_CLOSE<br>SMB_COM_WRITE_ANDX<br>SMB_COM_WRITE_BULK<br>SMB_COM_WRITE_BULK_DATA | Write | Write( SashFid Fid, LONG Offset, LONG Count,<br>SAFEARRAY *buf, LONG *BytesWritten )<br>FFSFileFile::put((const char*)&RawBuffer,<br>Offset,<br>Count); FFSFile::seekToEnd(); |

Figure 3:
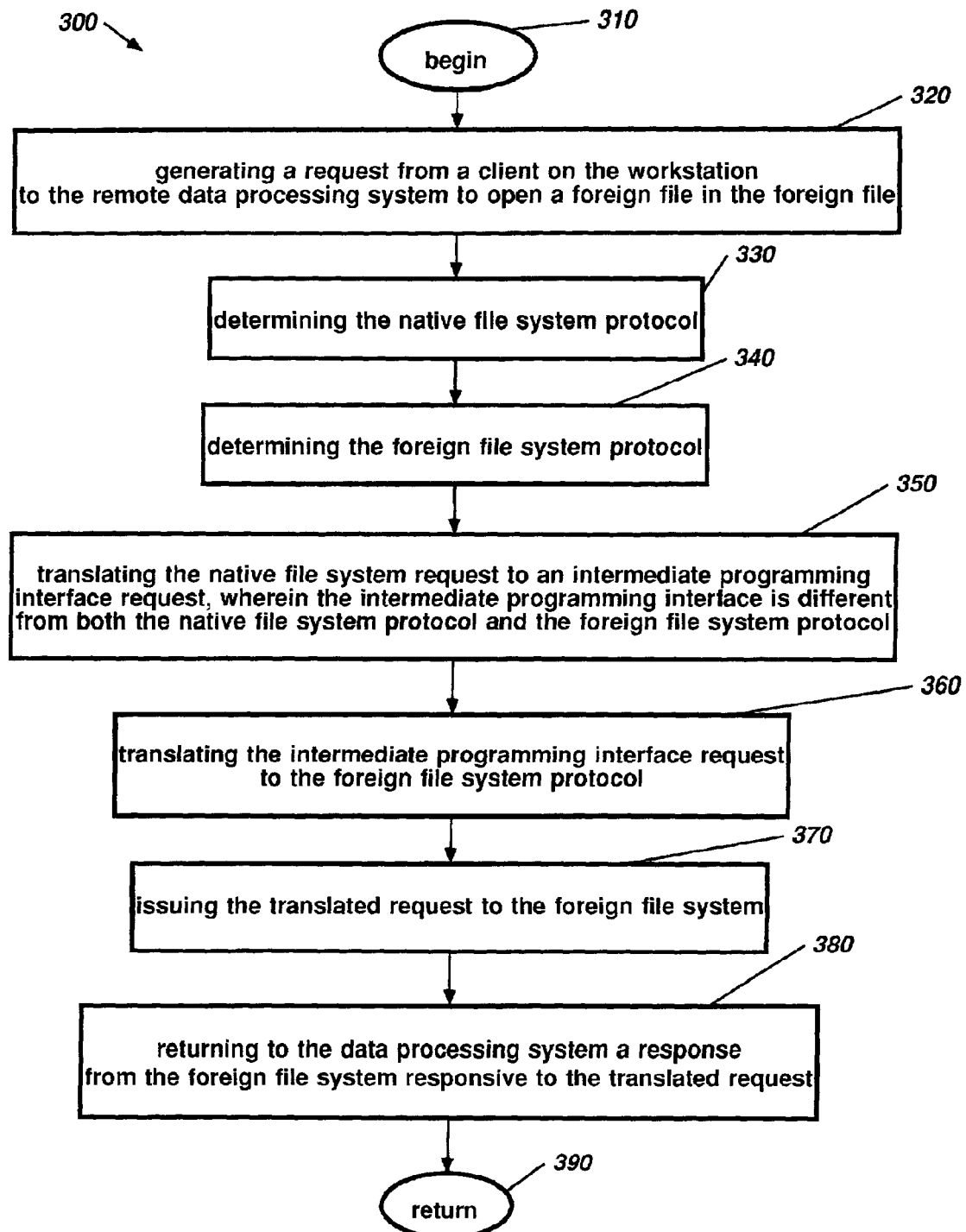
FIGS. 3 and 4 are flowcharts illustrating the operations preferred in carrying out a preferred embodiment of the present invention.
Figure 4:
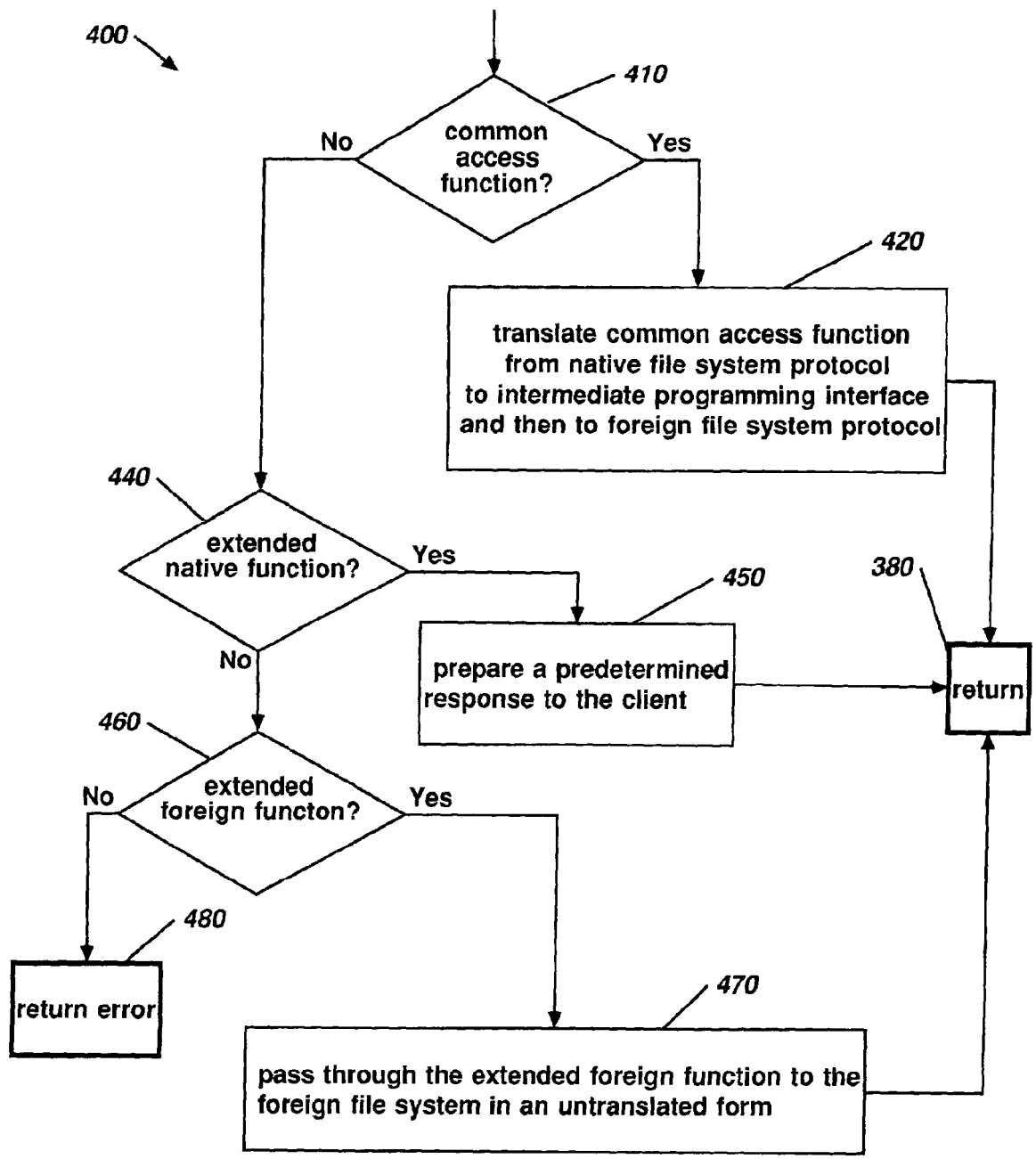

Referring now to FIG. 3 and FIG. 4, the flowcharts illustrate the operations preferred in carrying out the preferred embodiment of the present invention. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language for an assembler, interpreter, or compiler.

Referring first to FIG. 3, after the start 310 of the process 300, a native request from a client on the workstation to the remote data processing system to open a foreign file in the foreign file is generated in process block 320. Responsive to the request, process block 330 determines the native file system protocol; and process block 340 determines the foreign file system protocol. Thereafter, process block 350 translates the native file system request to an intermediate programming interface, wherein the intermediate programming interface is different from both the native file system protocol and the foreign file system protocol. Process block 360 then translates the intermediate file system request to the foreign file system protocol. Thereafter, process block 370 issues the translated request to the foreign file system; and process block 380 returns to the client a response from the foreign file system responsive to the translated request. The process then ends at process block 390.

Referring now to FIG. 4, process 400 is an expansion of the translation process steps 340, 350, 360, and 370 of FIG. 3. Decision block 410 determines if the native file system request is a common access function, an access function common to both the native file system protocol and the foreign file system protocol. If the native file system request is a common access function, then process block 420 translates the common access function from the native file system protocol to the intermediate programming interface and then translates it from the intermediate system protocol to the foreign file system protocol. Thereafter, processing continues to process block 380 which returns the response to the client.

Returning now to decision block 410, if the native file system request is not a common access function, then decision block 440 determines if the native file system request is an extended native function, a native file system functions which have no equivalent function in the foreign file system protocol. If the native file system request is an extended native function, then process block 450 prepare a predetermined response to be sent to the client, preferably indicating the inability of the foreign file system to service the request. Thereafter, processing continues to process block 380 which returns the response to the client.

Returning now to decision block 440, if the native file system request is not an extended native function, then decision block 460 determines if the native file system request is an extended foreign function, a foreign file system function which has no equivalent function in the native file system protocol. If the native file system request is an extended foreign function, then process block 470 passes through the extended foreign function to the foreign file system in an untranslated form. Thereafter, processing continues to process block 380 which returns the response from the extended foreign function to the client.

Returning now to decision block 460, if the native file system request is not an extended foreign function, then process block 480 returns an error to the client as the request was neither a common, extended native, nor extended foreign function.

Using the foregoing specification, the invention may be implemented using standard programming and/or engineering techniques using computer programming software, firmware, hardware or any combination or sub-combination thereof. Any such resulting program(s), having computer readable program code means, may be embodied within one or more computer usable media such as fixed (hard) drives, disk, diskettes, optical disks, magnetic tape, semiconductor memories such as Read-Only Memory (ROM), Programmable Read-Only Memory (PROM), etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network. An apparatus for making, using, or selling the invention may be one or more processing systems including, but not limited to, central processing unit (CPU), memory, storage devices, communication links, communication devices, servers, input/output (I/O) devices, or any sub-components or individual parts of one or more processing systems, including software, firmware, hardware or any combination or sub-combination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer sub-components embodying the invention and to create a computer system and/or computer sub-components for carrying out the method of the invention. Although the present invention has been particularly shown and described with reference to a preferred embodiment, it should be apparent that modifications and adaptations to that embodiment may occur to one skilled in the art without departing from the spirit or scope of the present invention as set forth in the following claims.

We claim:

1. An extensible file access method for accessing a foreign file system from a data processing system with a native file system, said foreign file system and said native file system implementing different file system protocols, and wherein files created by the foreign file system may not be accessed using a native file system protocol, said file access method comprising:
issuing a request according to the native file system protocol to perform a file system operation with respect to the foreign file system;
translating the native file system request to an intermediate programming interface, wherein the intermediate programming interface is different from both the native file system protocol and a foreign file system protocol, and wherein the intermediate programming interface comprises a set of generic access functions common to the native file system protocol and the foreign file system protocol;
translating the intermediate programming interface to a file system request according to the foreign file system protocol;
using the translated file system request according to the foreign file system protocol to perform the requested file system operation with respect to the foreign file system; and
returning to the data processing system a response from the foreign file system responsive to the translated request in the foreign file system protocol.

2. The file access method of claim 1, wherein the file access method is extended to support a second foreign file system by providing a translation from the intermediate programming interface to the second foreign file system protocol, said method further comprising:
determining the foreign file system protocol.

3. The file access method of claim 1, wherein the file access method is extended to support a second native file system by providing a translation from the second native file system protocol to the intermediate programming interface, said method further comprising:
determining the native file system protocol.

4. The file access method of claim 1, wherein the intermediate programming interface further comprises a set of file system specific functions which are not common to the file system protocols.

5. The file access method of claim 4, wherein the set of generic access functions common to the native file system protocol and the foreign file system protocol are translated from the native file system protocol to the intermediate programming interface which is then translated to the foreign file system protocol, and wherein the set of file system specific functions which are not common to the file system protocols are not translated from the native file system protocol to the intermediate programming interface which is then translated to the foreign file system protocol.

6. The file access method of claim 5, wherein the set of file system specific functions which are not common to the file system protocols further comprises a set of extended native file system functions which have no equivalent function in the foreign file system protocol.

7. The file access method of claim 6, wherein the set of extended native file system functions causes a predetermined response to be sent to the data processing system.

8. The file access method of claim 5, wherein the set of file system specific functions which are not common to the file system protocols further comprises a set of extended foreign file system functions which have no equivalent function in the native file system protocol.

9. The file access method of claim 8, wherein the set of extended foreign file system functions are passed through to the foreign file system in an untranslated form.

10. An article of manufacture for use in a computer system for providing an extensible file access method for accessing a foreign file system from a data processing system with a native file system, said foreign file system and said native file system implementing different file system protocols, and wherein files created by the foreign file system may not be accessed using a native file system protocol, said article of manufacture comprising a computer-readable storage medium having a computer program embodied in said medium which causes the computer system to execute the access method comprising:
issuing a request according to the native file system protocol to perform a file system operation with respect to the foreign file system;
translating the native file system request to an intermediate programming interface, wherein the intermediate programming interface is different from both the native file system protocol and a foreign file system protocol, and wherein the intermediate programming interface comprises a set of generic access functions common to the native file system protocol and the foreign file system protocol;
translating the intermediate programming interface to a file system request according to the foreign file system protocol;
using the translated file system request according to the foreign file system protocol to perform the requested file system operation with respect to the foreign file system; and
returning to the data processing system a response from the foreign file system responsive to the translated request in the foreign file system protocol.

11. The article of manufacture of claim 10, wherein the file access method is extended to support a second foreign file system by providing a translation from the intermediate programming interface to the second foreign file system protocol, said method further comprising:
determining the foreign file system protocol.

12. The article of manufacture of claim 10, wherein the file access method is extended to support a second native file system by providing a translation from the second native file system protocol to the intermediate programming interface, said method further comprising:

determining the native file system protocol.

13. The article of manufacture of claim 10, wherein the intermediate programming interface further comprises a set of file system specific functions which are not common to the file system protocols.

14. The article of manufacture of claim 13, wherein the set of generic access functions common to the native file system protocol and the foreign file system protocol are translated from the native file system protocol to the intermediate programming interface which is then translated to the foreign file system protocol, and wherein the set of file system specific functions which are not common to the file system protocols are not translated from the native file system protocol to the intermediate programming interface which is then translated to the foreign file system protocol.

15. The article of manufacture of claim 14, wherein the set of file system specific functions which are not common to the file system protocols further comprises a set of extended native file system functions which have no equivalent function in the foreign file system protocol.

16. The article of manufacture of claim 15, wherein the set of extended native file system functions causes a predetermined response to be sent to the data processing system.

17. The article of manufacture of claim 14, wherein the set of file system specific functions which are not common to the file system protocols further comprises a set of extended foreign file system functions which have no equivalent function in the native file system protocol.

18. The article of manufacture of claim 17, wherein the set of extended foreign file system functions are passed through to the foreign file system in an untranslated form.

19. An extensible file access system for accessing a foreign file system from a data processing system with a native file system, said foreign file system and said native file system implementing different file system protocols, and wherein files created by the foreign file system may not be accessed using a native file system protocol, said file access system comprising:

a request issued according to the native file system protocol to perform a file system operation with respect to the foreign file system;

a translator for translating the native file system request to an intermediate programming interface, wherein the intermediate programming interface is different from both the native file system protocol and a foreign file system protocol, and wherein the intermediate programming interface comprises a set of generic access functions common to the native file system protocol and the foreign file system protocol;

a translator for translating the intermediate programming interface to a file system request according to the foreign file system protocol;

using the translated file system request according to the foreign file system protocol to perform the requested file system operation with respect to the foreign file system; and a response returned to the data processing system from the foreign file system responsive to the translated request in the foreign file system protocol.

20. The file access system of claim 19, wherein the file access system is extended to support a second foreign file system by providing a translator for translation from the intermediate programming interface to the second foreign file system protocol.

21. The file access system of claim 19, wherein the file access system is extended to support a second native file system by providing a translator for translation from the second native file system protocol to the intermediate programming interface.

22. The file access system of claim 19, wherein the intermediate programming interface further comprises a set of file system specific functions which are not common to the file system protocols.

23. The file access system of claim 22, wherein the set of generic access functions common to the native file system protocol and the foreign file system protocol are translated from the native file system protocol to the intermediate programming interface which is then translated to the foreign file system protocol, and wherein the set of file system specific functions which are not common to the file system protocols are not translated from the native file system protocol to the intermediate programming interface which is then translated to the foreign file system protocol.

24. The file access system of claim 23, wherein the set of file system specific functions which are not common to the file system protocols further comprises a set of extended native file system functions which have no equivalent function in the foreign file system protocol.

25. The file access system of claim 24, wherein the set of extended native file system functions causes a predetermined response to be sent to the data processing system.

26. The file access system of claim 23, wherein the set of file system specific functions which are not common to the file system protocols further comprises a set of extended foreign file system functions which have no equivalent function in the native file system protocol.

27. The file access system of claim 26, wherein the set of extended foreign file system functions are passed through to the foreign file system in an untranslated form.

28. The file access method of claim 1, wherein the request to perform the file system operation with respect to the foreign file system comprises a request to create or delete a directory in the foreign file system.

29. The file access method of claim 1, wherein request to perform the file system operation with respect to the foreign file system comprises a request to delete a file in the foreign file system.

30. The file access method of claim 1, wherein request to perform the file system operation with respect to the foreign file system comprises a request to rename a file in the foreign file system.

31. The article of manufacture of claim 10, wherein the request to perform the file system operation with respect to the foreign file system comprises a request to create or delete a directory in the foreign file system.

32. The article of manufacture of claim 10, wherein request to perform the file system operation with respect to the foreign file system comprises a request to delete a file in the foreign file system.

33. The article of manufacture of claim 10, wherein request to perform the file system operation with respect to the foreign file system comprises a request to rename a file in the foreign file system.

34. The file access system of claim 19, wherein the request to perform the file system operation with respect to the foreign file system comprises a request to create or delete a directory in the foreign file system.

35. The file access system of claim 19, wherein request to perform the file system operation with respect to the foreign file system comprises a request to delete a file in the foreign file system.

36. The file access system of claim 19, wherein request to perform the file system operation with respect to the foreign file system comprises a request to rename a file in the foreign file system.

\* \* \* \* \*